United States Patent [19]

Rundo

[11] Patent Number: 4,988,400
[45] Date of Patent: Jan. 29, 1991

[54] METHOD AND APPARATUS FOR TREATING THE SURFACE OF AN INSULATING STRIP

[75] Inventor: John R. Rundo, Strongsville, Ohio
[73] Assignee: Tremco Incorporated, Cleveland, Ohio
[21] Appl. No.: 417,707
[22] Filed: Oct. 4, 1989
[51] Int. Cl.$^5$ ............................................. B32B 31/18
[52] U.S. Cl. .................................... 156/247; 156/153; 156/209; 156/324; 156/344; 156/584
[58] Field of Search ................. 156/94, 153, 209, 344, 156/584, 324, 247

[56] References Cited

U.S. PATENT DOCUMENTS

| | | | |
|---|---|---|---|
| Re. 24,937 | 2/1961 | Lea | 156/94 |
| 2,916,079 | 12/1959 | Schiefer | |
| 3,037,898 | 6/1962 | Zumofen | 156/94 |
| 3,730,815 | 5/1973 | Terzian | 156/527 |
| 3,733,237 | 5/1973 | Wolff | 156/468 |
| 3,951,727 | 4/1976 | Greenberg | 156/344 X |
| 4,174,246 | 11/1979 | Ralston | 156/391 |
| 4,466,847 | 8/1984 | Held | 156/324 X |
| 4,600,466 | 7/1986 | Herrmann | 156/391 |
| 4,623,421 | 11/1986 | Cardin | 156/523 |
| 4,666,539 | 5/1987 | Karzmer | 156/94 |
| 4,699,686 | 10/1987 | Franke | 156/579 |
| 4,756,789 | 7/1988 | Kolff | 156/391 |
| 4,759,810 | 7/1988 | Jackson et al. | 156/64 |
| 4,769,105 | 9/1988 | Lisec | 156/468 |
| 4,849,063 | 7/1989 | McXinnon | 156/391 |

FOREIGN PATENT DOCUMENTS 1234682 4/1988 Canada .
293302 11/1988 European Pat. Off. .
8600068.3 1/1986 Fed. Rep. of Germany .

OTHER PUBLICATIONS

"Notice Technique—ligne double vitrage," *Societe Atlantique de Materiels Appliques a la Production* (Mar. 1987).
"Tous Vitrages Isolants" (Sep. 1986).
"Swiggle Strip for Insulating Glass," Tremco Ltd. (date unknown).
Photographs of Muntin Alignment table of Product Design & Development of York, Pennsylvania.
Photographs of hand-held insulating strip applicator of Quelen of France.
Photographs of applicator device of La Fond, Inc. of Quebec, Canada.
Photographs of hand-held applicator of La fond, Inc. of Quebec, Canada.

*Primary Examiner*—Robert A. Dawson
*Attorney, Agent, or Firm*—Willian Brinks Olds Hofer Gilson & Lione

[57] ABSTRACT

A method and apparatus for treating the surface of an insulating strip for use in the manufacture of multi-pane windows. The apparatus and methods of one embodiment of the invention includes a texturing roller which leaves a textured impression in a surface of the insulating strip, thereby improving the desiccating and altering the sheen and otherwise affecting the appearance of the insulating strip. According to an alternative embodiment of the invention, method and apparatus are provided for laminating a moisture vapor permeable layer onto a surface of the insulating strip. The apparatus of the invention also includes forming rollers for restoring the profile of the insulating strip.

31 Claims, 2 Drawing Sheets

METHOD AND APPARATUS FOR TREATING THE SURFACE OF AN INSULATING STRIP

BACKGROUND OF THE INVENTION

This invention relates to a method and apparatus for treating the surface of an insulating strip. More particularly, the present invention relates to a method and apparatus for texturing the surface of an insulating strip, or alternatively, laminating a moisture vapor permeable layer onto the surface of an insulating strip.

When manufacturing multi-pane windows, it is necessary to seal the space between the window panes such that the panes are maintained at a fixed separation. One product which is frequently employed for this purpose is an insulating strip sold by Tremco, Inc. under the trade name SWIGGLE STRIP. Such insulating, or sealant, strips are typically made of butyl.

The insulating strip also contains a desiccant. When the temperature of the window drops below the dew point thereby causing the moisture vapor in the air trapped between the panes to condense, the desiccant within the insulating strip will absorb the moisture vapor. Therefore, the insulating strip acts to seal the window together, provide a consistent space between the panes of the window and prevent the accumulation of moisture on the inside of the window.

Double-pane windows as described above are typically fit with a frame which wraps around the edges of the window and covers the majority of the insulating strip. However, the side of the insulating strip which is exposed to the air trapped inside the window usually remains visible even after the window has been installed.

A typical insulating strip has a high gloss finish. In some applications, however, a high gloss finish may be objectionable. Particularly if the window frame has a flat finish, a high gloss insulating strip would not be desirable.

Because the insulating strip is black in color, its visibility, regardless of the sheen, is frequently undesirable. For example, if the window frame is white, the black insulating strip will obviously provide a great deal of contrast with the window frame. The manufacturer or consumer may prefer that the insulating strip not appear so dominant when the window is viewed in its installed position.

Apart from the aesthetic appearance of the insulating strip, the desiccating ability of the insulating strip may decrease over time if the insulating strip is stored for a substantial time between its manufacture and installation into a window. Insulating strips are typically manufactured with a release paper sealing the sides of the insulating strip. However, over time this seal may fail, causing the desiccant exposed to the ambient air to exhaust its absorbency by absorbing any moisture in the air to which it is exposed.

An additional problem which can arise in connection with the use of the insulating strip is that the integrity of its cross section is not always adequately preserved from the time the insulating strip is manufactured and to the time it is installed in a window. Although manufactured according to given tolerances, because of the pliable nature of the insulating strip, the consistency of the dimensions of the insulating strip may easily be disrupted as the insulating strip is handled. The possibility of the integrity of the dimensions of the insulating strip being disrupted increases as the insulating strip is handled prior to its installation into a window.

One of the primary functions of the insulating strip is to act as a spacer between the two panes of the window into which it is installed. If the insulating strip is not of constant dimensions, the two panes of the window may not be in parallel planes. Also, inconsistencies in the dimensions of the insulating strip may result in a faulty seal between the insulating strip and the panes of the window.

Thus, although the butyl insulating strip has gained widespread acceptance for use as a window sealant, certain difficulties with its use do exist. Therefore, it will be appreciated that what is needed in the art are methods and apparatus for treating the surface of an insulating strip thereby altering the appearance of the surface which is visible following its installation into a window.

Indeed, it would be an advancement in the art if such methods and apparatus could alter the sheen of the insulating strip. It would be an additional advancement in the art if such methods and apparatus could be employed to alter the appearance of the color of the insulating strip.

It would be yet a further advancement in the art if methods and apparatus could be provided for enhancing the desiccating ability of the insulating strip. It would be an additional advancement in the art if such methods and apparatus could also restore the integrity of the dimensions of the profile of the insulating strip prior to its installation into a window.

Such methods and apparatus are disclosed and claimed herein.

SUMMARY OF THE INVENTION

The present invention is directed to novel methods and apparatus for treating an insulating strip prior to its installation into a window.

In a preferred embodiment of the invention, a roller having a textured surface is axially mounted for rotation. Means for guiding the insulating strip into contact with the surface of the texturing roller are also provided. The texturing roller is provided with a textured surface which, when placed in contact with the surface of the insulating strip, leaves an imprint in the surface of the insulating strip.

In operation, the insulating strip is fed on a roller or conveyor belt past the texturing roller such that there is tangential contact between the surface of the texturing roller and the insulating strip. As the texturing roller rolls along the insulating strip, the insulating strip is imprinted according to the texture provided on the surface of the roller.

A variety of types of textured surfaces may be employed on the texturing roller. For example, a wire brush may be employed as the texturing roller. Use of a wire brush for the texturing roller provides a series of small indentations in the surface of the insulating strip thereby providing a dull, or flat, finish to the insulating strip. Alternatively, a knurled roller may be utilized as the textured roller, providing a variety of patterns which may be imprinted into the insulating strip and also affecting the sheen of the finish of the insulating strip.

Imprinting a pattern into the insulating strip not only affects the appearance of the insulating strip, it also increases the surface area of the insulating strip which is exposed to the air inside the window in which the insulating strip will ultimately be installed. By increasing the amount of surface area exposed, the desiccating ability of the strip is enhanced because more desiccant is exposed.

In the case of an insulating strip which has been in storage for some time prior to its installation into a window, texturing its surface also exposes fresh desiccant. The exposure of fresh desiccant assists in compensating for any reduction in desiccating ability which may result from inadvertent exposure of the insulating strip to moisture since its manufacture.

In an alternative embodiment of the present invention, a layer of a moisture vapor permeable material is laminated to that surface of the insulating strip which will be visible following its installation in a window. Two elongated rollers are provided through which the insulating strip and the surface layer are fed. The rollers provide pressure thereby laminating the surface layer onto the surface of the insulating strip.

The surface layer may comprise any one of a variety of materials, including a film, cloth, wire mesh or plastic webbing. Thus, when it is desired to alter the color of the inside edge of the window, an appropriately colored surface layer may be selected. It is necessary that the surface layer have a sufficient degree of moisture vapor permeability that any moisture vapor in the air trapped between the panes of the window when the window is manufactured will be able to penetrate the laminate and be absorbed by the desiccant in the insulating strip.

In an additional embodiment of the invention, forming rollers are provided. As the insulating strip is fed along the surface treatment device, the insulating strip is also fed between sets of forming rollers which restore the profile of the insulating strip to its original dimensions.

Thus, it is an object of the present invention to provide methods and apparatus for treating the surface of an insulating strip prior to its installation in a window.

It is also an object of the present invention to provide such methods and apparatus which may be utilized to texture the surface of the insulating strip, thereby improving its aesthetic appeal and increasing its desiccating capabilities.

It is a further object of the present invention to provide methods and apparatus for laminating a surface layer onto the insulating strip to alter the color of the inside edge of the window in which the insulating strip is employed.

It is an additional object of the present invention to restore the original profile dimensions to the profile strip.

These and other objects and advantages of the present invention will become apparent by examination of the following description of the preferred embodiments and the accompanying drawings.

DETAILED DESCRIPTION OF THE PREFERRED EMBODIMENTS OF THE INVENTION

Figure 1:
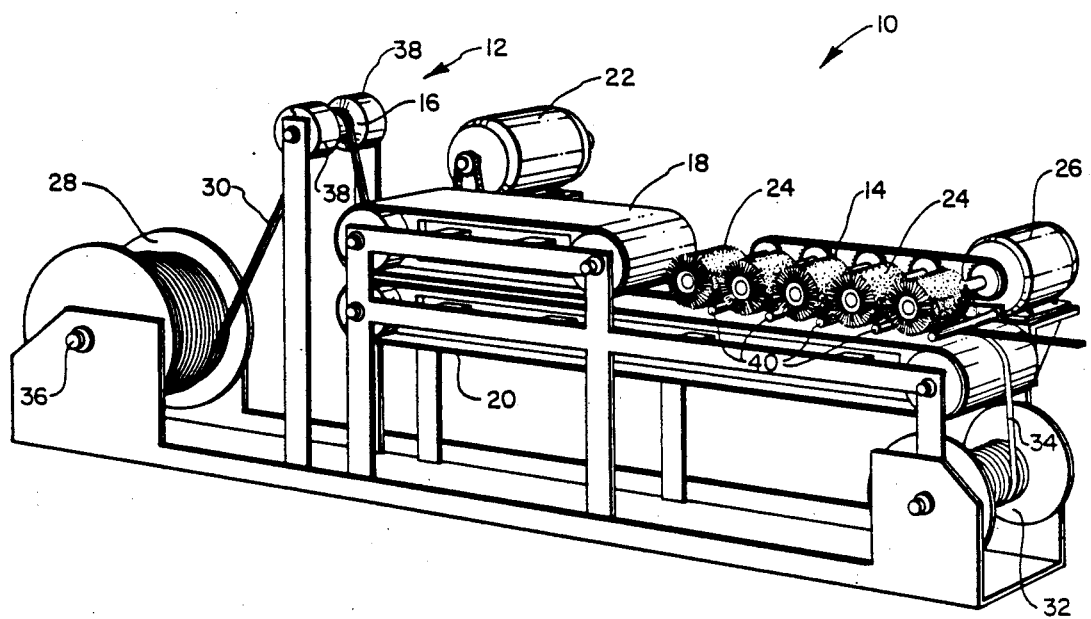
FIG. 1 is a perspective view of one embodiment of the present invention, illustrating a series of wire rollers for texturing the insulating strip to provide it with a flat finish.

Reference is now made to the figures wherein like parts are referred to by like numerals throughout. With particular reference to FIG. 1, one embodiment of an apparatus for texturing the surface of an insulating strip is generally designated as 10. As used herein, the term "insulating strip" refers to pliable sealants or tapes such as those used in the manufacture of multi-pane windows. One such sealant is manufactured by Tremco, Inc. under the trade name SWIGGLE STRIP.

The texturing apparatus 10 includes guiding means 12 and a plurality of texturing rollers 14. In the embodiment of the present invention illustrated in FIG. 1, guiding means 12 includes a guide roller 16, an upper belt 18 and a lower belt 20. As viewed in FIG. 1, lower belt 20 extends the entire length of upper belt 18 and continues on to provide support for the insulating strip beneath the texturing rollers 14. Upper belt 18 and lower belt 20 are driven by a motor 22.

Texturing rollers 14, in this embodiment of the invention, include a plurality of wire brushes 24. The wire brushes 24 are all axially mounted and are driven by a motor 26. The number of wire brushes 24 employed depend upon the particular texture desired. The use of wire brushes 24 as texturing rollers 14 is particularly advantageous when it is desired to remove the high gloss sheen of the insulating strip. By generating small perforations in the surface of the insulating strip, a dull, flat, sheen is produced.

A feed reel 28 is provided upon which is wound insulating strip 30. On the opposite side of the apparatus, a take-up reel 32 is mounted for removing the release paper 34 from the insulating strip 30.

In operation, a roll of insulating strip 30 is axially mounted for rotation about a feed axis 36. Because the insulating strip 30 is typically manufactured in a roll, it is usually not necessary to transfer the insulating strip 30 onto a separate feed reel. Thus, the roll on which the insulating strip is wound when manufactured becomes the feed reel 28.

Guiding means 12 acts to guide the insulating strip 30 onto approximately the centerline of lower belt 20. In this presently preferred embodiment of the invention, guiding means 12 includes guide roller 16 having flanges 38 which position the insulating strip in the center of guide roller 16. Although the guiding means is specifically disclosed herein as a guide roller with flanges, it will be appreciated that a variety of mechanical devices may be employed for positioning the insulating strip generally in the center of guide roller 16.

With its lateral position fixed by the guide roller 16, the insulating strip is fed between upper belt 18 and lower belt 20. Upper belt 18 is preferably covered with a release material such a silicone to prevent the insulating strip from adhering to the roller. Because insulating strip 30 is typically manufactured with a release paper 34 on one side, it is not necessary to include a release material on the surface of lower belt 20. However, if an insulating strip is employed that does not have a release paper on it, it will also be necessary to include a release material on the surface of lower belt 20 to ensure that the insulating strip will not stick to the belt after it has been textured.

As the insulating strip emerges from the upper belt 18, it is fed by the lower belt 20 through the texturing rollers 14. As mentioned, in this embodiment of the present invention, wire brushes 24 are employed to provide the texture to the insulating strip. A series of pins 40 are provided after each wire brush to assist in separating the insulating strip from the wire brushes 24. In a preferred embodiment, the pins 40 are each enclosed with a collar (not shown) that is capable of rotation about the pin.

The wire brushes are mounted such that the bristles of the brushes slightly penetrate the surface of the insulating strip. When the insulating strip is manufactured, its surface is typically smooth—having a high gloss sheen. By perforating the surface of the insulating strip with the wire brushes, the surface may be provided with a dull finish. The ultimate sheen of the insulating strip may be controlled to some extent by controlling the frequency of the perforations generated in the surface of the insulating strip. This may be accomplished by adjusting the number of wire brushes, or employing brushes with various bristle densities.

After the surface of the insulating strip 30 has been textured by the wire brushes 24, the release paper 34 is removed from the insulating strip by the take-up roll 32 and the insulating strip is ready for use. Thus, the texturing apparatus 10 of the present invention may be set up to provide a preliminary process to the automated application of the insulating strip to windows. Alternatively, the release paper 34 may be left on the insulating strip and the insulating strip may be wound upon a spool and stored until needed or used in combination with a hand-held apparatus for applying insulating strip to windows. It is preferable that the insulating strip be used immediately so that the texture is not disturbed by the rolling up and storage of the insulating strip and to maximize the effectiveness of the desiccant freshly exposed by the texturing process.

Figure 2:
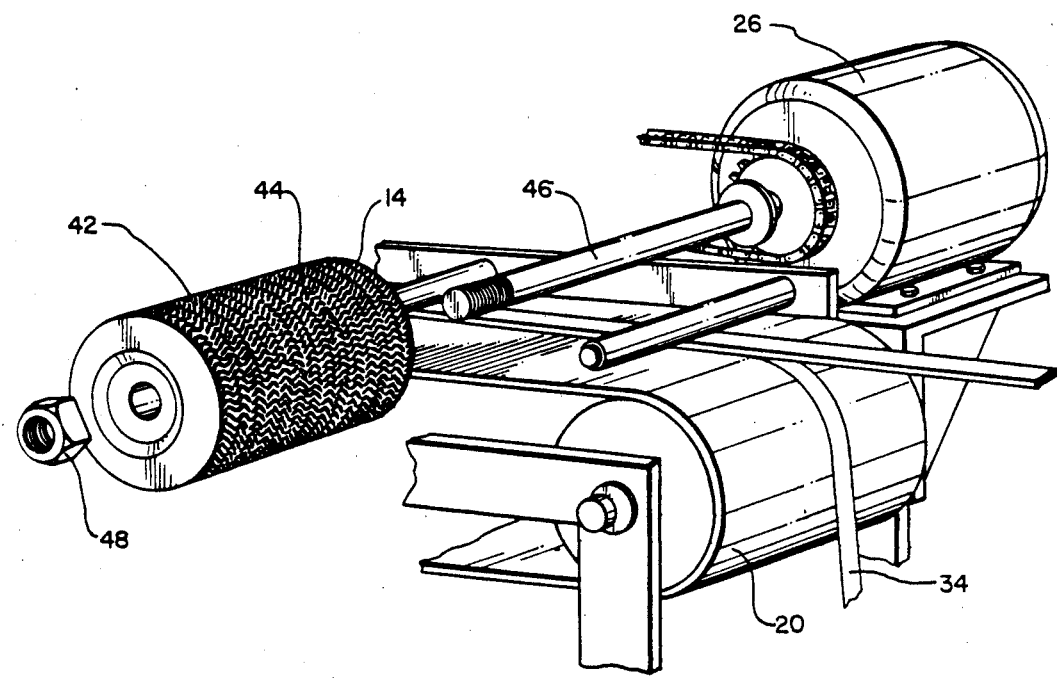
FIG. 2 is an exploded perspective view of a texturing roller for texturing an insulating strip with a herringbone pattern, according to one embodiment of the present invention, and additionally illustrating how the texturing rollers are removable.

Referring now to FIG. 2, an alternative embodiment of texturing roller 14 is illustrated. In FIG. 2, a knurled roller 42 is employed. The surface 44 of the knurled roller 42 is preferably made or coated with a release material such as silicone or teflon to assist in preventing the insulating strip from adhering to the roller.

In this embodiment of the invention, knurled roller 42 is provided with a herringbone pattern. It will be appreciated that a variety of patterns could be employed in addition to the herringbone pattern illustrated. In addition to a pattern, particular manufacturers could utilize a texturing roller to impress a trade name or other designation of origin or information pertinent to the insulating strip into the surface of the insulating strip.

FIG. 2 also illustrates that the texturing rollers 14 may be easily replaced with rollers having a variety of surfaces accordingly to the preferences of the manufacturer. The roller is mounted on an axis 46 and held firmly in place by a nut 48. When it is desired to change the roller, the nut 48 may be quickly removed from the axis 46 thereby permitting the roller to be removed and replaced with another.

Figure 3:
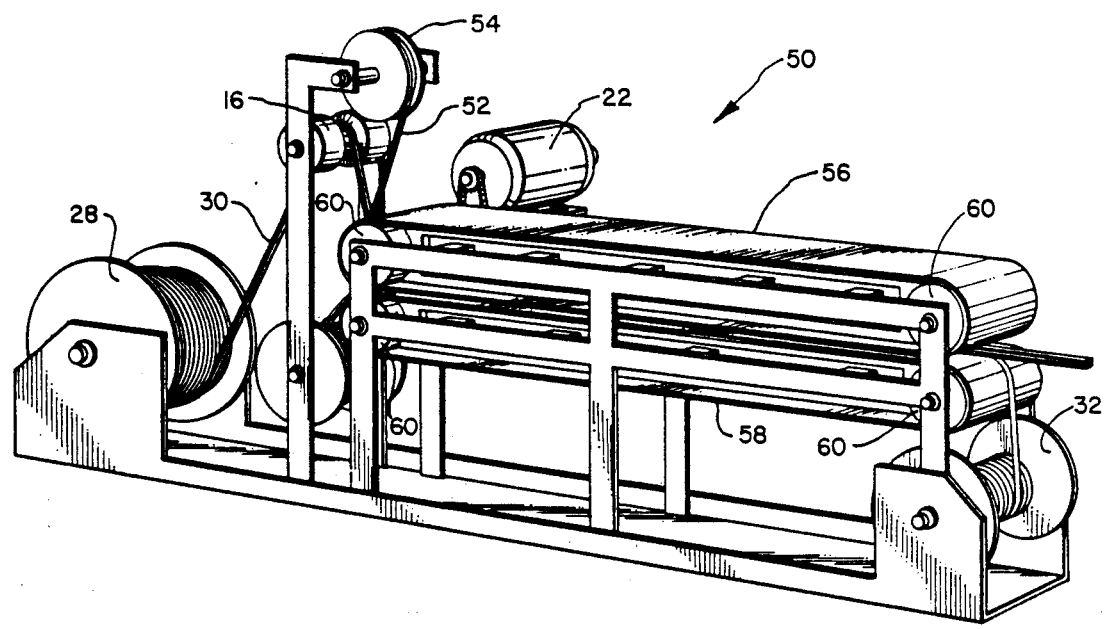
FIG. 3 is a perspective view of the laminating belts used in laminating a surface layer onto the insulating strip according to an alternative embodiment of the invention.

With reference now to FIG. 3, an alternative embodiment of the present invention is illustrated. In FIG. 3 a laminating apparatus according to the present invention is generally designated a 50. The laminating apparatus includes a surface layer, or laminate, 52 which is wound upon a laminate feed roll 54. An upper laminating belt 56 and a lower laminating belt 58 are mounted for rotation about end rollers 60.

In operation, insulating strip 30 is fed from the feed reel 28 through the guide roller 16 as with the texturing apparatus of FIG. 1. As the insulating strip 30 is fed between the upper and lower laminating belts 56 and 58, the surface layer 52 is fed from the laminate feed roll 54 onto the insulating strip. Thus, as the insulating strip and surface layer feed through the upper and lower laminating belts, the pressure generated by the belts on the insulating strip laminates the surface layer onto the soft surface of the insulating strip.

The surface layer 52 may comprise any of a variety of materials. For example, films, cloth, wire mesh and plastic webbing are all suitable for use as the surface layer. However, if the surface layer completely covers the surface of the insulating strip, the surface layer must have sufficient moisture vapor permeability such that any moisture vapor trapped within the window during its manufacture can penetrate the surface layer and be absorbed by the desiccant in the insulating strip.

Laminating a surface layer onto an insulating strip may be preferable over simply texturing the insulating strip depending o the particular application. If it is desired to change the color of the insulating strip as viewed on the inside edge of the window, this can easily be done by laminating to the insulating strip a surface layer of the desired color.

Figure 4:
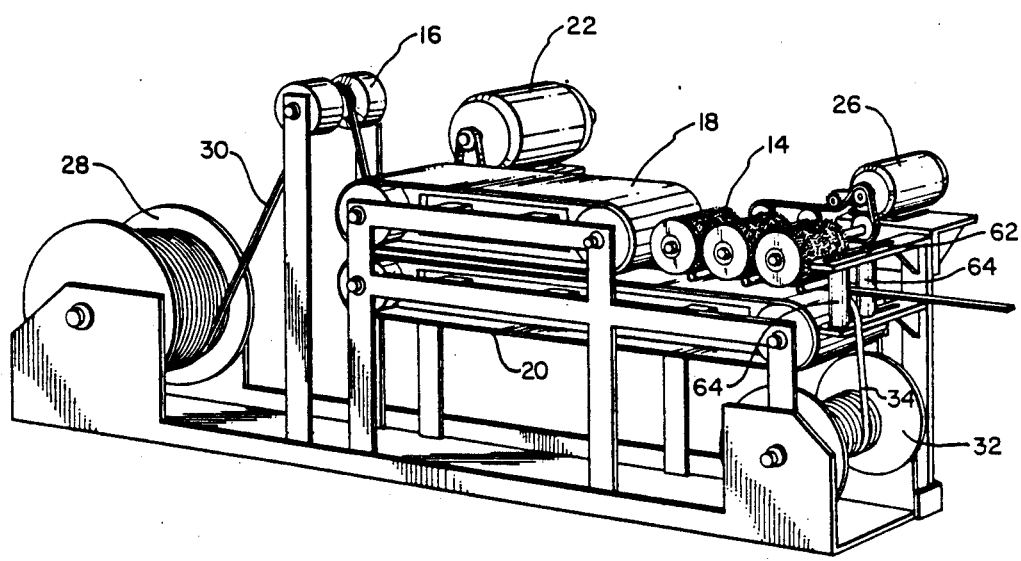
FIG. 4 is a perspective view of an alternative embodiment of the invention, further illustrating the forming rollers used to restore the appropriate dimensions to the profile of the insulating strip.

FIG. 4 illustrates how the present invention can also be used to restore the profile of the insulating strip to its original dimensions. Upper belt 18 and lower belt 20 act to smooth out the upper and lower surface of the insulating strip. As the insulating strip leaves lower belt 20, it passes through vertical forming rollers 62. Vertical forming rollers 62 serve to make the edges of the insulating strip straight.

Vertical forming rollers 62 are also provided with adjustment means 64 by which the space between the vertical forming rollers may be adjusted. Accordingly, regardless of the dimensions of the insulating strip being treated, the apparatus of the present invention can be adjusted to correct any deviations which may exist in the shape of the profile of the insulating strip to approximately the same cross-sectional dimensions it had prior to being imprinted by the texturing roller.

Although vertical forming rollers 62 are illustrated herein as used in combination with the texturing apparatus, it will be appreciated that they may also be employed in combination with the laminating apparatus 50 illustrated in FIG. 3.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

I claim:

1. An apparatus for texturing the surface of an insulating strip, comprising:

a roller having a textured surface;
means for guiding a surface of the insulating strip into contact with the textured surface of the roller; and
a pin mounted adjacent the roller for separating the insulating strip from the roller.

2. An apparatus for texturing the surface of an insulating strip as defined in claim 1, further comprising an axis upon which the roller is rotatably mounted.

3. An apparatus for texturing the surface of an insulating strip as defined in claim 1, further comprising means for mounting the roller on the axis such that the roller may be detached from the axis.

4. An apparatus for texturing the surface of an insulating strip as defined in claim 1, wherein the roller is a wire brush.

5. An apparatus for texturing the surface of an insulating strip as defined in claim 4, further comprising a plurality of wire brushes.

6. An apparatus for texturing the surface of an insulating strip as defined in claim 1, wherein the surface of the roller is configured with a herringbone pattern.

7. An apparatus for texturing the surface of an insulating strip as defined in claim 1, wherein the guiding means comprises a guide roller having flanges which protrude from each end of the guide roller.

8. An apparatus for texturing the surface of an insulating strip as defined in claim 7, wherein the guiding means further comprises an upper belt and a lower belt, the upper belt mounted parallel to the lower belt and configured such that the insulating strip may pass between the upper and lower belts.

9. An apparatus for texturing the surface of an insulating strip as defined in claim 1, further comprising supply means for providing a supply of insulating strip with release paper adhered to it and a take-up reel for removing the release paper from the insulating strip.

10. An apparatus for texturing the surface of an insulating strip as defined in claim 1, further comprising at least one pair of forming rollers mounted parallel to each other such that the insulating strip may pass between the forming rollers.

11. An apparatus for texturing the surface of an insulating strip as defined in claim 10, further comprising means for mounting the forming rollers such that the distance between the forming rollers may be adjusted.

12. An apparatus for texturing the surface of an insulating strip, comprising:
a roller having a textured surface;
an axis upon which the roller is rotatably mounted;
means for mounting the roller on the axis such that the roller may be detached from the axis;
a rotatable pin mounted adjacent each roller for separating the insulating strip from the roller;
means for guiding a surface of the insulating strip into contact with the textured surface of the roller, the guide means comprising:
a guide roller having flanges which protrude from each end of the guide roller;
an upper belt; and
a lower belt, the upper belt mounted parallel to the lower belt and configured such that the insulating strip may pass between the upper and lower belts;
supply means for providing a supply of insulating strip with release paper adhered to it;
a take-up reel for removing the release paper from the insulating strip;
at least one pair of forming rollers mounted parallel to each other such that the insulating strip may pass between the forming rollers; and
means for mounting the forming rollers such that the distance between the forming rollers may be adjusted.

13. An apparatus for texturing the surface of an insulating strip as defined in claim 12, wherein the roller is a wire brush.

14. An apparatus for texturing the surface of an insulating strip as defined in claim 13, further comprising a plurality of wire brushes.

15. An apparatus for texturing the surface of an insulating strip as defined in claim 12, wherein the surface of the roller is configured with a herringbone pattern.

16. An apparatus for laminating a moisture vapor permeable layer onto an insulating strip, comprising:
supply means for providing a supply of insulating strip with release paper adhered to it;
a take-up reel for removing the release paper from the insulating strip;
a first laminating belt;
a second laminating belt mounted parallel to the first laminating belt, the first and second laminating belts configured such that when the moisture vapor permeable layer and the insulating strip are passed between the first and second laminating belts, a sufficient pressure is imparted on the moisture vapor permeable layer and the insulating strip to laminate the moisture vapor permeable layer onto the surface of the insulating strip; and
means for guiding the insulating strip between the first and second laminating belts.

17. An apparatus for laminating a moisture vapor permeable layer onto an insulating strip as defined in claim 16, further comprising a laminate feed roller for positioning the moisture vapor permeable layer with respect to the first and second laminating belts.

18. An apparatus for laminating a moisture vapor permeable layer onto an insulating strip as defined in claim 16, wherein the guiding means comprises a guide roller having flanges which protrude from each end of the guide roller.

19. An apparatus for laminating a moisture vapor permeable layer onto an insulating strip as defined in claim 16, further comprising at least one pair of forming rollers mounted parallel to each other such that the insulating strip may pass between the forming rollers.

20. An apparatus for laminating a moisture vapor permeable layer onto an insulating strip as defined in claim 19, further comprising means for mounting the forming rollers such that the distance between the forming rollers may be adjusted.

21. A method for texturing the surface of an insulating sealant strip with a texturing roller, comprising the steps of:
providing a supply of insulating sealant strip from a source;
directing the insulating sealant strip to the texturing roller;
placing the insulating sealant strip in tangential adherent contact with the texturing roller such that the surface of the insulating sealant strip is imprinted by the texturing roller; and
removing from the roller any portion of insulating sealant strip which remains adhered to the roller.

22. A method for texturing the surface of an insulating sealant strip as defined in claim 21, further comprising the step of restoring the profile of the insulating sealant strip to approximately the same cross-sectional dimensions it had prior to being imprinted by the texturing roller.

23. A method for laminating a moisture vapor permeable layer onto a surface of an insulating strip by passing the moisture vapor permeable layer and the insulating strip between laminating belts, comprising the steps of:
  providing a supply of insulating strip with release paper adhered to it;
  removing the release paper from the insulating strip;
  aligning the moisture vapor permeable layer with the surface of the insulating strip; and
  directing the moisture vapor permeable layer and the insulating strip between the laminating belts such that a sufficient pressure is imparted on the moisture vapor permeable layer and the insulating strip to laminate the moisture vapor permeable layer onto the surface of the insulating strip.

24. A method for laminating a moisture vapor permeable layer onto a surface of an insulating strip as defined in claim 23, further comprising the step of restoring the profile of the insulating strip to approximately the same cross-sectional dimensions it had prior to being laminated with the moisture vapor permeable layer.

25. An apparatus for texturing the surface of an insulating sealant strip, comprising:
  supply means for providing a supply of insulating sealant strip from a source;
  a roller having a textured surface;
  a guide in connection with the roller configured to guide the insulating strip into rolling adherent contact with the textured surface of the roller to imprint the surface of the insulating sealant strip with the texture of the roller; and
  means for removing from the roller any portion of insulating sealant strip which remains adhered to the roller.

26. An apparatus for texturing the surface of an insulating sealant strip as defined in claim 25, wherein the removing means comprises a pin mounted adjacent to the roller.

27. An apparatus for texturing the surface of an insulating sealant strip as defined in claim 25, wherein the roller is a wire brush.

28. An apparatus for laminating a moisture vapor permeable layer onto an insulating strip having a first and a second surface with release paper adhered to the first surface, comprising:
  a first laminating belt;
  a second laminating belt mounted parallel to the first laminating belt, the first and second laminating belts configured such that when the moisture vapor permeable layer and the insulating strip are passed between the first and second laminating belts, a sufficient pressure is imparted on the moisture vapor permeable layer and the insulating strip to laminate the moisture vapor permeable layer onto the second surface of the insulating strip;
  means for guiding the insulating strip between the first and second laminating belts; and
  a take-up reel for removing the release paper from the first surface of the insulating strip.

29. An apparatus for laminating a moisture vapor permeable layer onto an insulating strip as defined in claim 28, further comprising at least one pair of forming rollers mounted parallel to each other such that the insulating strip may pass between the forming rollers.

30. A method for laminating a moisture vapor permeable layer onto a surface of an insulating strip by passing the moisture vapor permeable layer and the insulating strip between laminating belts, the insulating strip having a first and second surface with release paper adhered to the first surface, comprising the steps of:
  aligning the moisture vapor permeable layer with the surface of the insulating strip;
  directing the moisture vapor permeable layer and the insulating strip between the laminating belts such that a sufficient pressure is imparted on the moisture vapor permeable layer and the insulating strip to laminate the moisture vapor permeable layer onto the second surface of the insulating strip; and
  removing the release paper from the first surface of the insulating strip.

31. A method for laminating a moisture vapor permeable layer onto a surface of an insulating strip as defined in claim 30, further comprising the step of restoring the profile of the insulating strip to approximately the same cross-sectional dimensions it had prior to being laminated with the moisture vapor permeable layer.

* * * * *